US006898729B2

(12) United States Patent
Virolainen et al.

(10) Patent No.: US 6,898,729 B2
(45) Date of Patent: May 24, 2005

(54) METHODS AND APPARATUS FOR TRANSMITTING MIDI DATA OVER A LOSSY COMMUNICATIONS CHANNEL

(75) Inventors: Jussi Virolainen, Espoo (FI); Pauli Laine, Espoo (FI)

(73) Assignee: Nokia Corporation, Espoo (FI)

( * ) Notice: Subject to any disclaimer, the term of this patent is extended or adjusted under 35 U.S.C. 154(b) by 582 days.

(21) Appl. No.: 10/101,900

(22) Filed: Mar. 19, 2002

(65) Prior Publication Data

US 2004/0209629 A1 Oct. 21, 2004

(51) Int. Cl.[7] .................................................. G06F 11/00

(52) U.S. Cl. ............................................. 714/4; 84/645

(58) Field of Search .......................... 714/4, 43; 84/645

(56) References Cited

U.S. PATENT DOCUMENTS

| | | | | | |
|---|---|---|---|---|---|
| 5,300,725 | A | * | 4/1994 | Manabe | 84/609 |
| 5,977,468 | A | * | 11/1999 | Fujii | 84/609 |
| 6,342,666 | B1 | * | 1/2002 | Shutoh | 84/645 |
| 2004/0154460 | A1 | * | 8/2004 | Virolainen et al. | 84/645 |
| 2004/0159219 | A1 | * | 8/2004 | Holm et al. | 84/645 |

OTHER PUBLICATIONS

"MMidi: The MBONE Midi Tool" 1996.*

"A Case for Network Musical Performance"; Lazzaro, J. et. al.; NOSSDAV'01; Jun. 25–26, 2001, Port Jefferson, New York, USA.

http://www.ietf.org/internet–drafts/draft–ietf–avt–mwpp–midi–rtp–02.txt.; The MIDI Wire Protocol Packetization (MWPP); Lazzero, J. et. al.; Feb. 28, 2002.

http://www/ietf.org/rfc/rfc1889.txt.; "RTP: A Transport Protocol for Real–Time Applications"; Schulzarinne, H. et. al.; Jan. 1996.

http://search.ietf.org/internet–drafts/draft–ietf–avt–rtp–selret–03.txt.; "RTP Payload Formats to Enable Multiple Selective Retransmissions" Miyazaki, A. et. al.; Nov. 2001.

http://search.ietf.org/internet–drafts/draft–leon–rtp–retransmissions–01.txt.; "RTP Retransmission Framework"; Leon, D. et. al.; Nov. 2001.

http://search.ietf.org/internet–drafts/draft–ietf–avt–rtcp–feedback–01.txt.; Extended RTP Profile for RTCP–based Feedback (RTP/AVPF); Nov. 21, 2001.

"Scalable Polyphony MIDI Device 5–24 Note Profile for 3GPP"; The MIDI Manufactures Association; Nov. 29, 2001.

"Scalable Polyphony MIDI Specification"; The MIDI Manufactures Association; Nov. 29, 2001.

* cited by examiner

*Primary Examiner*—Bryce P. Bonzo

(74) *Attorney, Agent, or Firm*—Harrington & Smith, LLP

(57) ABSTRACT

A method and system are disclosed for transmitting MIDI messages between a transmitter and a receiver through a link that is susceptible to errors. The method includes parsing MIDI messages to be transmitted into a critical category and a non-critical category, and transmitting critical category MIDI messages using a reliable transmission protocol and non-critical category MIDI messages using a less reliable transmission protocol. As an example, a non-critical category of MIDI message is a Note On message, and a critical category MIDI message is a corresponding Note Off message. The step of parsing preferably includes atomizing certain MIDI messages, such as Note On/Note Off pairs, that in turn can include encapsulating the certain MIDI messages within a common transmission packet. In a presently preferred, but non-limiting embodiment of this invention the steps of parsing and transmitting occur within a mobile terminal, and the link comprises a low power, short range radio frequency link that can be a uni-directional radio frequency link, or a bi-directional radio frequency link that provides an indication from a receiver to the transmitter when MIDI data is received with an error. The mobile terminal may provide a user with knowledge of when MIDI data has been received with an error. Link error management may be adaptive as a function of at least the link quality.

48 Claims, 3 Drawing Sheets

PACKET FORMAT

METHODS AND APPARATUS FOR TRANSMITTING MIDI DATA OVER A LOSSY COMMUNICATIONS CHANNEL

TECHNICAL FIELD

These teachings relate generally to wireless communications systems and methods and, more particularly, relate to Musical Instrument Digital Interface (MIDI) data and messages, and to techniques for transmitting MIDI data and messages between devices through a wireless communications channel, such as a radio frequency (RF) or an optical (e.g., infrared (IR)) communications channel.

BACKGROUND

The information exchanged between two MIDI devices is musical in nature. MIDI information informs a music synthesizer, in a most basic mode, when to start and stop playing a specific note. Other information includes the volume and modulation of the note, if any. MIDI information can also be more hardware specific. It can inform a synthesizer to change sounds, master volume, modulation devices, and how to receive information. In more advanced uses, MIDI information can be used to indicate the starting and stopping points of a song or the metric position within a song. More recent applications include using the interface between computers and synthesizers to edit and store sound information for the synthesizer on the computer.

The basis for MIDI communication is the byte, and each MIDI command has a specific byte sequence. The first byte of the MIDI command is the status byte, which informs the MIDI device of the function to perform. Encoded in the status byte is the MIDI channel. MIDI operates on 16 different channels, numbered 0 through 15. MIDI units will accept or ignore a status byte depending on what channel the unit is set to receive. Only the status byte has the MIDI channel number encoded, and all other bytes are assumed to be on the channel indicated by the status byte until another status byte is received.

As is shown in greater detail in the following Table, some of the functions indicated in the status byte are Note On, Note Off, System Exclusive (SysEx) and Patch Change. Depending on the status byte, a number of different byte patterns can follow. The Note On status byte tells the MIDI device to begin sounding a note. Two additional bytes are required, a pitch byte, which tells the MIDI device which note to play, and a velocity byte, which tells the device how loud to play the note. Even though not all MIDI devices recognize the velocity byte, it is still required to complete the Note On transmission.

Reference can be made to the Complete MIDI 1.0 Detailed Specification, MMA 1995, for further details on the structure and operation of MIDI (available at www.midi.org/about-midi/specinfo.htm).

The command to stop playing a note is not part of the Note On command; but is instead a separate Note Off command. This command also requires two additional bytes with the same functions as the Note On command. The Patch Change byte requires only one additional byte that corresponds to the program number on the synthesizer. The patch number information is different for each synthesizer.

The SysEx status byte can be used to initiate a number of functions. Briefly, the SysEx byte requires at least three additional bytes. The first is a manufacturer's ID number or timing byte, the second is a data format or function byte, and the third is generally an "end of transmission" (EOX) byte.

TABLE

| Status D7–D0 | Data Byte(s) D7–D0 | Description |
|---|---|---|
| | | Channel Voice Messages |
| 1000cccc | 0nnnnnnn 0vvvvvvv | Note Off event. This message is sent when a note is released (ended).(nnnnnnn) is the note number. (vvvvvvv) is the velocity. |
| 1001cccc | 0nnnnnnn 0vvvvvvv | Note On event. This message is sent when a note is depressed (start). (nnnnnnn) is the note number. |
| 1010cccc | 0nnnnnnn 0vvvvvvv | Polyphonic Key Pressure (Aftertouch). This message is sent when the pressure (velocity) of a previously triggered note changes. (nnnnnnn) is the note number. (vvvvvvv) is the new velocity. |
| 1011cccc | 0nnnnnnn 0vvvvvvv | Control Change. This message is sent when a controller value changes. Controllers include devices such as pedals and levers. Certain controller numbers are reserved for specific purposes (see Channel Mode Messages) (ccccccc) is the controller number. (vvvvvvv) is the new value. |
| 1100cccc | 0ppppppp | Program Change. This message is sent when the patch number changes. (ppppppp) is the new program number. |
| 1101nnnn | 0ccccccc | Channel Pressure (After-touch). This message is sent when the channel pressure changes. Certain velocity-sensing keyboards do not support polyphonic after-touch. This message can be used to send the single greatest velocity (of all the current depressed keys). (ccccccc) is the channel number. |
| 1110nnnn | 01111111 0mmmmmmmm | Pitch Wheel Change. This message is sent to indicate a change in the pitch wheel. The pitch wheel is measured by a fourteen bit value. Center (no pitch change) is 2000H. Sensitivity is a function of the transmitter. (111111) are the least significant 7 bits. (mmmmmm) are the most significant 7 bits. |
| | | Channel Mode Messages (See also Control Change, above) |
| 1011nnnn | 0ccccccc 0vvvvvvv | Note that for the Channel Mode Messages the same code as the Control Change (above) is used, but Mode control is implemented by using reserved controller numbers. The numbers are: Local Control: When Local Control is Off, all devices on a given channel will respond only to data received over MIDI. Played data, etc. is ignored. Local Control On restores the functions of the normal controllers. c = 122, v = 0: Local Control Off c = 122, v = 127: Local Control On All Notes Off: When an All Notes Off is received, all oscillators will turn off. c = 123, v = 0: All Notes Off c = 124, v = 0: Omni Mode Off c = 125, v = 0: Omni Mode On. c = 126, v = M: Mono Mode On (Poly Off) where M is the number of channels (Omni Off) or 0 (Omni On) c = 127, v = 0: Poly Mode On (Mono Off) (Note: These four messages also cause All Notes Off) |
| | | System Common Messages |
| 11110000 | 0iiiiiii 0ddddddd . . . 0ddddddd 11110111 | System Exclusive. This message covers unsupported MIDI features. (iiiiiii) is a seven bit Manufacturer's I.D. code. If the synthesizer recognizes the I.D. code as its own, it will listen to the rest of the message (ddddddd). Otherwise, the message will be ignored. System |

TABLE-continued

| Status D7–D0 | Data Byte(s) D7–D0 | Description |
|---|---|---|
| | | Exclusive is used to send bulk dumps such as patch parameters and other non-specific data. (Note: Real-Time messages only may be interleaved with a System Exclusive.) |
| 11110001 | | Undefined. |
| 11110010 | 0lllllll 0mmmmmmm | Song Position Pointer. This is an internal 14 bit register that holds the number of MIDI beats (1 beat = six MIDI clocks) since the start of a song. 1 is the LSB, m the MSB. |
| 11110011 | 0sssssss | Song Select. The Song Select specifies which sequence or song is to be played. |
| 11110100 | | Undefined. |
| 11110101 | | Undefined. |
| 11110110 | | Tune Request. Upon receiving a Tune Request, all analog synthesizers tune their oscillators. |
| 11110111 | | End of Exclusive. Used to terminate a System Exclusive dump (see above). |
| | System Real-Time Messages | |
| 11111000 | | Timing Clock. Sent 24 times per quarter note when synchronization is required. |
| 11111001 | | Undefined. |
| 11111010 | | Start. Start the current sequence playing. (This message will be followed with Timing Clocks). |
| 11111011 | | Continue. Continue at the point the sequence was Stopped. |
| 11111100 | | Stop. Stop the current sequence. |
| 11111101 | | Undefined. |
| 11111110 | | Active Sensing. Use of this message is optional. When initially sent, the receiver will expect to receive another Active Sensing message each 300 ms (max), or it will be assumed that the connection has been terminated. At termination, the receiver turns off all voices and returns to normal (non-active sensing) operation. |
| 11111111 | | Reset. Reset all receivers in the system to power-up status. |

While well suited for its originally intended applications, it has been found that MIDI is not particularly well suited for use in a wireless communications environment or, more generally, when transmission through a lossy, error-prone transmission channel is required. However, it would be desirable to provide wireless users with entertaining audio applications, such as one that could be referred to as group playing, that would require streaming MIDI connectivity between mobile terminals. Unfortunately, the integration of radio transmission technologies and MIDI has not proven to be robust when using conventional methods.

Modem mobile systems provide radio transmission technologies such as Bluetooth (low power, short range RF communications) that enable applications in different devices to easily communicate with each other. An important requirement for data transmission is the reliability, while latency is not a critical feature, whereas for speech transmission a short latency and a constant jitter variance are the most important parameters, while the reliability is typically not as critical.

However, a short latency (interactivity), small jitter variance and high reliability are all important and desirable features for MIDI transmission. These requirements can be contradictory when over-the-air transmission is used, especially when the quality of the radio channel is low. When the channel quality degrades the error rate increases, causing the effective transmission bandwidth to decrease. If an unreliable transmission protocol is being used then MIDI messages can be corrupted or lost, which is normally unacceptable. On the other hand, if a reliable transmission protocol is being used the latency will tend to increase because of re-transmissions that may render useless a time critical musical communication.

As was made apparent above, MIDI messages represent symbolic data. A given MIDI message can be independent from other messages, or it can have a relationship to other messages. Because of this relationship between MIDI messages, message corruption or loss during transmission is not acceptable. Examples of very critical related MIDI events are the Note On and the corresponding Note Off messages. If a Note Off message is missing after a corresponding Note On message, the result can be a note to be played for an unacceptably long period of time (i.e., a "hanging" note).

A Network Musical Performance (NMP) occurs when a group of musicians, located at different physical locations, interact over a network to perform as they would if located in the same room. In this environment the significance of a lost Note Off message has been recognized, as evidenced in a publication entitled "A Case for Network Musical Performance", J. Lazzaro and J. Wawrzynek, NOSSDAV'01, Jun. 25–26, 2001, Port Jefferson, N.Y., USA. These authors describe the use of a client/server architecture employing the IETF Real Time Protocol (RTP) to exchange audio streams by packet transmissions over a network. An RTP packet in the MIDI packetization scheme described by these authors is shown in FIG. 3, and includes a standard RTP header, including a sequence number and a timestamp, followed by a packet payload that contains a MIDI Command payload and a Recovery Journal. The Recovery Journal contains information that enables the receiver to recover from the loss of all RTP packets sent since an earlier RTP packet, referred to as a checkpoint packet. Appendix 1 of this publication describes the format of the Recovery Journal.

Related to this publication is another publication: "The MIDI Wire Protocol Packetization (MWPP)", also by J. Lazzaro and J. Wawrzynek, http://www.ietf.org/internet-drafts/draft-ietf-avt-mwpp-midi-rtp-02.txt, Internet Draft, Feb. 28, 2002 (expires Aug. 28, 2002).

The requirement to include the Recovery Journal in the packet payload can be a disadvantage when used in a bandwidth-constrained link, such as a wireless link. Further, the maintenance of the Recovery Journal can add to the overall system complexity.

SUMMARY OF THE PREFERRED EMBODIMENTS

The foregoing and other problems are overcome, and other advantages are realized, in accordance with the presently preferred embodiments of these teachings.

A method is herewith provided to transmit MIDI information between at least two MIDI devices over an unreliable connection (such as a radio connection) with short latency. The method categorizes MIDI messages into critical and non-critical categories, and transmits non-critical messages using an unreliable connection while transmitting critical messages using a reliable connection (i.e., a connection that is deemed to be more reliable than the unreliable connection). As a result of transmission errors certain notes might may not be played and/or certain actions may be delayed, but the overall connection between the MIDI devices remains functional despite the errors. An important goal of the method is to enable channel voice messages to be transmitted over-the-air, however the method may be readily extended to cover all MIDI messages.

As described herein, and unless specified otherwise, a critical MIDI message that is sent by the reliable link, connection or protocol is one that is content-critical, as opposed to being only time-critical. An example is found in the Note On/Note Off message pair, where the Note Off message, although its timely arrival at the receiver is desirable, is actually content-critical, as the failure of its arrival can result in the occurrence of the undesirable hanging note.

An aspect of this method is a procedure for packing MIDI Note On/Note Off message pairs to prevent the hanging note problem from occurring. This procedure can be used also as an independent sub-system to ensure a minimal acceptable level of MIDI streaming capability.

A method and a system are disclosed for transmitting MIDI messages between a transmitter and a receiver through a link that is susceptible to errors. The method includes parsing MIDI messages to be transmitted into a critical category and a non-critical category, and transmitting critical category MIDI messages using a reliable transmission protocol and non-critical category MIDI messages using a less reliable transmission protocol. As an example, a non-critical category of MIDI message is a Note On message, and a critical category MIDI message is a corresponding Note Off message.

In a further embodiment of this invention the step of parsing preferably includes atomizing certain MIDI messages, such as Note On/Note Off pairs, that in turn can include encapsulating the certain MIDI messages within a common transmission packet.

In a presently preferred, but non-limiting embodiment of this invention the steps of parsing and transmitting occur within a mobile terminal, and the link comprises a low power, short range radio frequency link that can be a bi-directional radio frequency link or a uni-directional radio frequency link. The bi-directional radio frequency link preferably provides an indication from a receiver to the transmitter when MIDI data is received with an error, and the indication can be made through the same logical channel that the MIDI data is received through. In the bi-directional case two mobile stations can be connected through two logical bi-directional channels for conducting MIDI data in both directions. The mobile terminal may provide a user with knowledge of when MIDI data has been received with an error. Link error management may be adaptive as a function of at least the link quality. Further, when channel quality conditions are good the reliable transmission can be used, and if the quality degrades generating re-transmissions, then the transmission technique in accordance with this invention may be employed.

The use of logical uni-directional channels may be desired in some cases, although an ability to provide feedback from the receiver to the transmitter is limited or is non-existent. The logical uni-directional channel may thus be considered to be inherently unreliable. Two terminals can be connected through two logical uni-directional channels, one in each direction, and feedback may be provided over a different logical channel than the one the MIDI-related data is received through.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
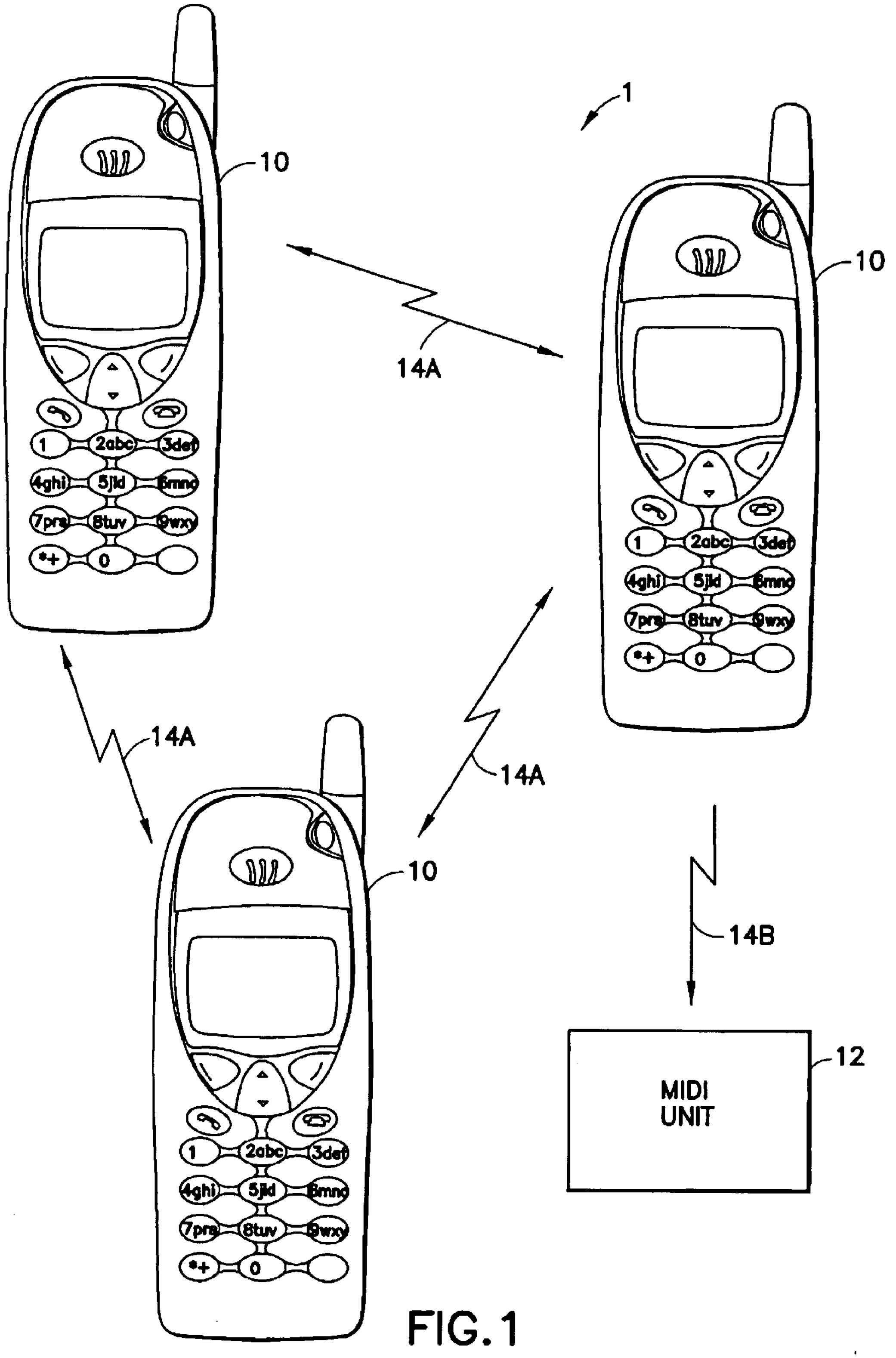
FIG. 1 is a high level block diagram showing a wireless communication network comprised of a plurality of MIDI devices, such as one or more mobile stations and one or MIDI units, such as a synthesizer.

FIG. 1 shows a wireless communication network 1 that includes a plurality of midi devices, such as one or more mobile stations 10 and one or MIDI units 12. The MIDI unit 12 could be or could contain a music synthesizer, a computer, or any device that has MIDI capability. The mobile stations 10 could include headphones (not shown), or the internal speaker could be used for playing music. One or more of the mobile stations 10 could also include a music synthesizer. Wireless links 14 are assumed to exist between the MIDI devices, and may include one or more bi-directional (two way) links 14A and one or more unidirectional (one way) links 14B. The wireless links 14 could be low power RF links (e.g., those provided by Bluetooth hardware), or they could be IR links provided by suitable LEDs and corresponding detectors. The wireless links 14 are assumed to be non-perfect lossy links, and can be susceptible to errors in data transmission.

Figure 2:
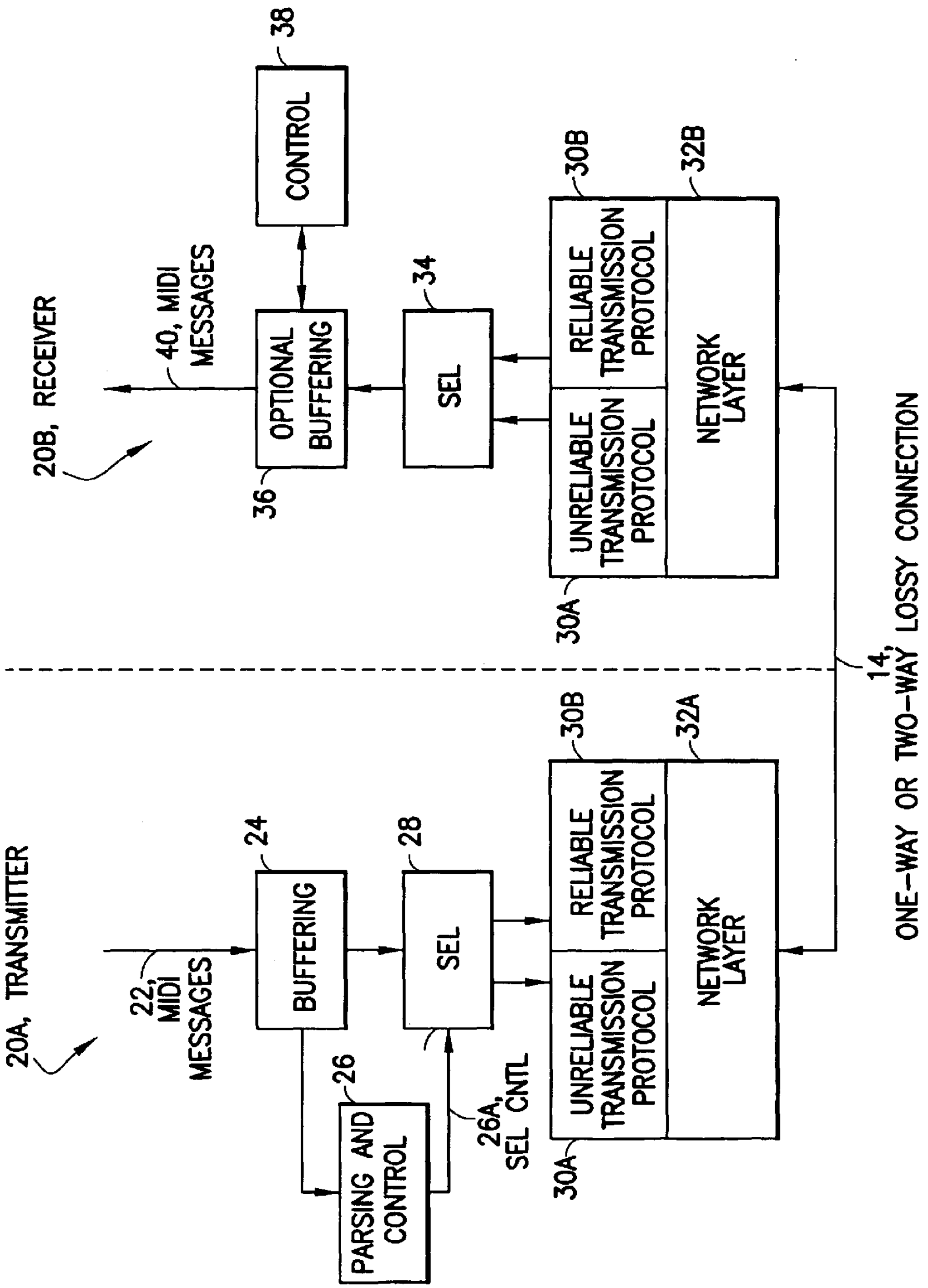
FIG. 2 is a block diagram in accordance with this invention showing a MIDI transmitter and a MIDI receiver coupled through a lossy communications channel.
Figure 3:
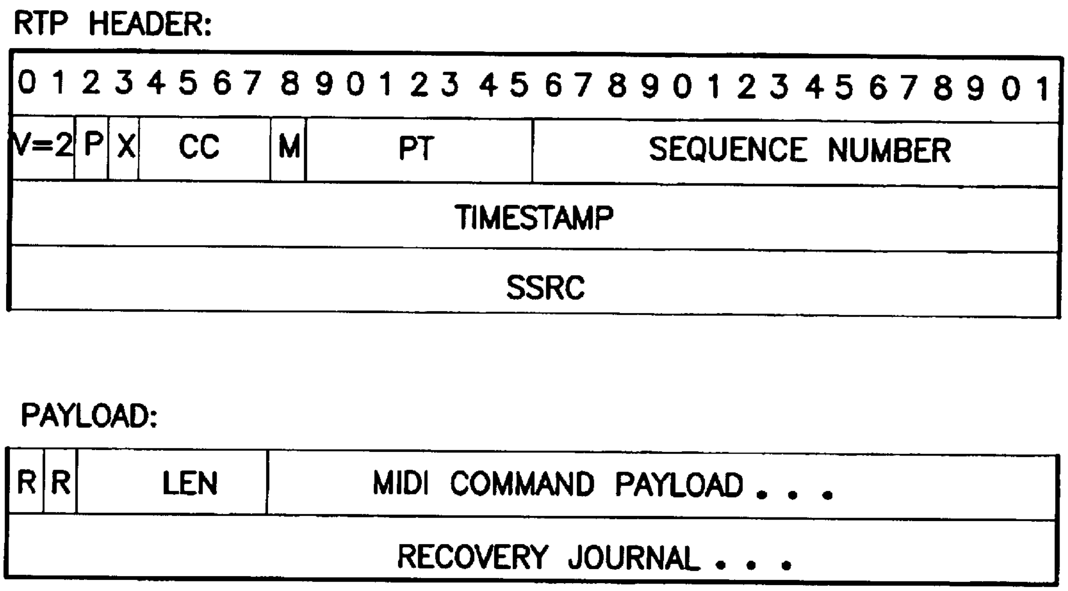
FIG.3 (PRIOR ART)
FIG. 3 shows a prior art RTP packet used in a MIDI packetization scheme for a Network Musical Performance (NMP) application.

The overall wireless communication system architecture may be or resemble a client/server architecture. As shown in FIG. 2, assume that one MIDI device is a transmitter 20A and another MIDI device is a receiver 20B, and the transmitter and receiver are coupled through a wireless link 14 that forms a one way or a two way lossy connection. Generated or arriving MIDI messages 22 at the transmitter 20A are applied to a buffer 24 and thence to a parsing and control block 26 and to a selector (SEL) 28. The parsing and control block 26 operates in accordance with an aspect of this invention to determine whether a particular MIDI message belongs in a non-critical category or in a critical category, and operates a SEL control (CNTL) signal line 26A accordingly to direct a specific MIDI message to an unreliable transmission protocol block 30A or to a reliable transmission protocol block 30B, respectively. The end result is that non-critical MIDI messages are transmitted through a network layer 32A using the more unreliable connection, while critical MIDI messages are transmitted through the network layer 32A using the more reliable connection.

At the receiver 20B the MIDI messages are received at the network layer 32B and directed to the proper one of the unreliable transmission protocol block 30A or to the reliable transmission protocol block 30B, depending on the selected protocol for the particular received MIDI message. A selector (SEL) 34, which could be a simple gate or even a wired OR connection, selects the output of either the unreliable transmission protocol block 30A or the reliable transmission protocol block 30B and provides it to an optional output buffer 36, which can operate in conjunction with a control block or unit 38. The output of the buffer 36 is a received MIDI message 40.

The buffer 36 makes it possible, in conjunction with control unit 38, to re-order the arriving MIDI messages according to ordering information sent with the MIDI messages, such as time stamps or sequence numbers. If one MIDI message is transmitted using the reliable protocol and a subsequent message is transmitted using the unreliable protocol, it is possible that these messages could arrive in the wrong order at the receiver 20B. This might happen if retransmission functionality is required during the reliable transmission due to errors. Another possibility that can result in the wrong arrival order is that the transport protocols have different latencies (buffering, etc.), even if no error occurs during transmission. The control unit 38 in the receiver 10B operates as a scheduler for the incoming messages, and is also responsible of discarding messages coming from the unreliable protocol that arrive too late for fulfilling their originally intended purpose. Because the unreliable protocol might not discard messages, even if they contain, e.g., bit errors, this function is also a task for the control unit 38. The reordering and buffering of messages that are scheduled for use in the future is also a feature of the control unit 38, as can occur, for example, when a Note On/Note Off message pair are sent in the same transmission packet (as described in further detail below).

In the transmitter and receiver protocol blocks 30A and 30B the necessary operations are performed on the MIDI message data that are compatible with the protocol. These operations can include encoding/decoding, framing, synchronizing, generating/testing error correction/detection syndromes, packetizing/unpacketizing and so forth. Reordering is also used when MIDI messages are demultiplexed from the reliable and the unreliable protocols, as described above.

Note that an "unreliable transmission protocol", for the purposes of this invention, is one that is less reliable than, or more error prone than, the "reliable transmission protocol". The unreliable transmission protocol is, simply put, relatively less reliable than the reliable transmission protocol, and need not be inherently unreliable. In general, the MIDI information that is transmitted using the less reliable transmission protocol will experience less latency than the MIDI information that is transmitted using the more reliable transmission protocol, which is advantageous as described below.

Note as well that the system-level block diagram of FIG. 2 can also be viewed as a logic flow diagram showing the overall method of this invention.

With regard to the client-server architecture, assume that the server runs on the sender or transmitter 20A and that the client runs in the receiver 20B. The server, via parsing and control block 26, parses the MIDI information stream, performs a process referred to herein as atomization, and multiplexes the resulting atoms to be sent over the unreliable or reliable connection. Depending on the connection (one-way or two-way) the server controls re-transmission according to the client's request and depending on the content of the lost or corrupted MIDI message.

Note that the time stamping of messages, or the application of sequence numbers, can also be done at the level of the parser and control block 26, or it can be done lower down in the transmission protocol levels 30A, 30B.

The client runs in the receiver 20B and is responsible for demultiplexing incoming MIDI messages from the reliable and unreliable connections. The client also detects and discards corrupted and missing MIDI messages and requests re-transmission from the server (in the two-way system). The client also preferably handles any necessary error detection and recovery, as well as any required timeout detection procedures.

The presently preferred embodiment of the wireless communication system 1 employs a static categorization of MIDI messages and the atomization of certain MIDI messages to find and associate inter-related MIDI messages. The categorization and atomization are preferably dynamic real-time parsing processes, and can differ in nature between, for example, group playing or Network Musical Performance applications (low latency required), and streaming MIDI applications.

For the purposes of this patent application streaming implies a substantially non-real time musical communication, such as playing an existing sequence/midi file. In contradistinction, group playing refers to substantially real time musical communication, such as can be encountered when in the above-referenced Network Musical Performance (NMP) mode.

The categorization and atomization depend also on the overall system architecture (one-way or two-way), as discussed below, and also handles, if necessary, the re-ordering of the incoming messages. Note that not all MIDI messages need be subject to atomization, For example, the Program Change message may also be transmitted using the reliable protocol. Note that categorization applies to all messages, whereas atomization applies to only certain messages.

The MIDI messages are preferably categorized based on their time and content characteristics, as described in Table 1. Examples of the categorization of certain MIDI messages are shown in Tables 2 and 3.

TABLE 1

An example of categorization of MIDI messages according to time and content requirements

| | Time critical | Time non-critical |
|---|---|---|
| Content critical | not supported | Reliable (e.g. Note Off) |
| Content non-critical | Unreliable (e.g. Note-on) | Unreliable or Reliable |

TABLE 2

Example categorization of MIDI messages (Channel Voice Messages) and the effect of transmission error(s) at the receiver 20B

| MIDI message | Connection | Effect of channel errors at the receiver |
|---|---|---|
| Note On | Unreliable | Note is not played |
| Note Off | Reliable | Note may become too short (one-way connection) or too long (two-way connection), but should not remain playing indefinitely. |
| Control Change | Unreliable or reliable | Current control value is missed (earlier remains) or control action is delayed (may depend on control action) |

TABLE 2-continued

Example categorization of MIDI messages (Channel Voice Messages) and the effect of transmission error(s) at the receiver 20B

| MIDI message | Connection | Effect of channel errors at the receiver |
|---|---|---|
| Program Change | Reliable | Change is delayed |
| Pitch Bend | Unreliable | Current value is missed (earlier remains) |
| Aftertouch | Unreliable | Effect does not occur |

TABLE 3

Example categorization of other MIDI messages

| MIDI message | Connection | Effect of channel errors on the message |
|---|---|---|
| Channel mode message | Reliable | Action is delayed |
| System Common messages | Reliable | Action is delayed |
| System Exclusives | Reliable | Action is delayed |
| System Real time messages | Reliable | Action is delayed |

Note that certain MIDI messages, such as the Timing Clock message that requires a low and constant latency, as well as reliability, may or may not be supported. Note as well that content critical MIDI messages are those that need to be transmitted to the receiver 20B in any case.

The above-mentioned atomization process implies that those MIDI messages that are related to each other as an event are combined. An example is the Note On/Note Off message pair that is processed by the parsing and control block 26 to form one atom. When there is a Note On message, a corresponding Note Off message is mandatory to avoid the generation of a hanging note. This implies that in a lossy transmission environment the loss of some specific part (here the Note Off message) of the atom is not acceptable, while the entire atom can be lost without suffering significant impairment. There are at least two preferred techniques to implement an atom.

In the first atom implementation the related parts are encapsulated in the same data packet that is sent over the connection (the entire atom is either received or it is lost/discarded). It is important in this case that some type of time stamp or scheduling information be added to the messages so that the receiver 20B can correctly schedule the execution of the events. For example, a Note On message may be provided to a synthesizer unit directly, while the Note Off message is not applied until the note is to terminate (e.g., perhaps some number of seconds later). It is within the scope of these teachings to provide a time stamp only with the Note Off message, or with both the Note On and the Note Off messages.

Note as well that several independent messages could be identified by the atomization process and incorporated into one packet.

In the second atom implementation the related parts are categorized to form an atom. In this case the atom would include, for example, a Note On message that can be transmitted over an unreliable connection, while the corresponding Note Off message is transmitted over a reliable connection. For the streaming application the Note Off message can be sent immediately with the corresponding Note On message, with a time stamp indicating when in the future it should be executed. In the group playing application the Note Off message is sent when it is generated (i.e., in real time). A lost Note On implies that the note is simply not played, while channel errors that occur during the reliable transmission of the Note Off result in a re-transmission that causes the Note Off message to arrive later than originally expected. That is, while the note may be played longer than intended, it is still correctly terminated. This mode is suitable for group playing and other real time musical communications.

The specifics of the system 1 implementation depend on the system architecture, primarily whether the connections 14 are uni-directional or bi-directional (one-way point-to-point or two-way point-to-point, respectively). One significant difference between these implementations is that the two-way architecture allows the sending of feedback messages from the receiver 20B to the transmitter 20A. In this case desired features of the transmission are (a) timestamp or sequence numbering of messages, (b) bit error detection (such as CRC) and/or error correction, such as Hamming-coding and, in two-way communication, the presence of reliable and unreliable transmission protocols or, alternatively, acknowledge messaging or signaling to request a re-transmission.

A simple protocol maybe constructed on top of the actual transmission protocol to accommodate these features. Using this information the receiver 20B can detect missing MIDI messages or discard corrupted MIDI messages. It is also within the scope of the teachings of this invention to rely on the services provided by the specific transmission protocols 30A, 30B. As an example, suitable protocols include, but are not limited to, TCP as the reliable transmission protocol 30B and RTP or UDP as the unreliable transmission protocol 30A.

With regard to the uni-directional point-to-point connection, feedback from the receiver 20B is not possible. Therefore, categorization and atom generation becomes more important. It is preferred that lost messages do not result in deadlock states or hanging notes. More specifically, in the unidirectional system it is preferred to place one atom (e.g., a Note On and corresponding Note Off) in the same transmission data packet. If the packet is lost or corrupted, the note is not played, but neither is a hanging note generated.

As a further possibility for atomization, or as a modification to the first atom implementation discussed above, the important case of the Note On/Note Off atomization can be addressed by combining corresponding related Note On and Note Off messages into one message. An advantage of this approach is to reduce the total amount of data that is required to be sent. This can be done by quantizing the dynamic value from 0,1,2,3 . . . 127 (using seven bits) to eight values (requiring only three bits), and using the remaining 16 values (four bits) to transmit the length of the note (e.g., as a pointer to a pre-specified note-length table). This procedure makes it possible to use MIDI without Note Off messages, i.e., by using only modified Note On messages that contain an embedded Note Off indication. Although the resolution of the dynamic values drops from 128 to eight, in most if not all applications this reduction is not noticeable by a listener. This approach requires, however, that the receiver 20B be aware of the system being used so that the receiver can correctly parse and re-scale the dynamic and note-length values of the Note On messages.

The uni-directional connection is particularly suitable for use with streaming applications, as real-time music generation would be difficult because the Note Off cannot be readily combined with the Note On. One solution to this is to limit the length of a note to be played. For example, the receiver 20B may automatically stop playing any note after, for example, four beats. In this case longer notes can be implemented by having the transmitter 20A periodically send Note On messages, thereby extending the length of the note to be greater than four beats.

Through the use of the bi-directional point-to-point connection the receiver 20B can request a re-transmission if some of a received MIDI message has been corrupted or has been lost during the transmission. The specifics of the feedback, however, depend on the implementation. If messages are sent using a general-purpose transmission protocol, such as TCP (reliable) or RTP (unreliable, but allows feedback using RTCP protocols), the feedback can be automatically performed by the protocol (general-purpose protocol feedback). For example, TCP automatically re-transmits data if it is corrupted or lost during previous transmission. If another protocol is used instead of TCP, the selected protocol preferably handles the requesting of re-transmission (customized feedback). In this case the request for re-transmission and the re-transmission decision can be made at a higher-level. If the transmitter 20A receives a notification that a message has been lost during transmission, it may decide if the re-transmission is required, depending on the message content that has been lost. In this situation the reliable and unreliable communications become more integrated.

Reference with regard to RTP and its retransmission capabilities can be made, for example, to the following: Schulzrinne, H., Casner, S., Frederick, R. and V. Jacobson, "RTP: A Transport Protocol for real-time applications", RFC 1889, January 1996; A.Miyazaki, H.Fukushima et al. "RTP Retransmission Payload Format", ietf-draft 18 Jul., 2001; Jorg Ott, Stephan Wenger et al. "Extended RTP Profile for RTCP-based Feedback", ietf-draft, 13 Jul., 2001; and Leon, David and Varsa, Viktor "RTP retransmission framework", ietf-draft, July 2001. Note that the draft documents are subject to change, and are thus referred to simply as describing suitable data transmission functions and protocols.

One problem with the use of TCP is that while TCP guarantees that data is sent reliably, it inherently does not pay attention to the required time to send the data, and the time to send the data successfully can become long if the channel quality is poor. An advantage of customized feedback is that when the transmitter 20A does not receive an acknowledge message (ACK) from the receiver 20B, or if it is signaled that some of the transmitted data has been lost (Negative ACK), it may decide, based at least in part on the data content of the lost or corrupted message, whether to re-transmit the data or to simply accept the loss. For example, the Note On message may not be re-transmitted, while a Note Off message could always be re-transmitted. The signaling of lost packets can be done as it is done conventionally in TCP, i.e., a missing Accept message triggers re-transmission, or a re-transmission request can signaled directly back to the transmitter 20A.

One goal of customized feedback is the optimization of latency. That is, when the quality of the wireless channel is poor, the time-critical information is discarded (so that re-transmission does not waste bandwidth) allowing content critical information to be received, or some other combination of procedures may be employed.

RTP and RTCP are protocols that may be used when transmitting over an Internet Protocol (IP) network. For communication when the network layers 32A and 32B are implemented using a Bluetooth network, however, a lighter protocol with corresponding functionality would be more suitable.

If only one MIDI message is sent in a protocol packet per unit of time, the detection of missing and corrupted packets and possible feedback signaling becomes rather straightforward. However, a main disadvantage of this approach is the overhead required by the header. Alternatively, if several MIDI messages are sent in one protocol packet (this could be useful, for example, when there are simultaneous onsets), there is less required overhead, but detection and signaling of missing data may become more difficult. A tradeoff may thus exist between the amount of MIDI information sent per packet, within a corresponding reduction in required overhead data and a corresponding increase in bandwidth utilization, versus the increased complexity of error detection, signalling and recovery.

Another technique to enhance the usability and reliability of the MIDI connection is to select the material to be sent according to the channel reliability or the channel bandwidth. Under difficult channel conditions a Scalable Polyphony MIDI (SP-MIDI) Maximum Instantaneous Polyphony (MIP) value can be changed in the receiver 20B so that lower polyphony is used, and less data is required to be submitted. Reference with regard to SP-MIDI can be found at www.midi.org., more specifically in a document entitled Scalable Polyphony MIDI Specification, Nov. 29, 2001, The MIDI Manufacturers Association, Los Angeles, Calif., and in a document entitled Scalable Polyphony MIDI Device 5-24 Note Profile for 3GPP, Nov. 29, 2001 (Draft), The MIDI Manufacturers Association, Los Angeles, Calif., both of which are incorporated by reference herein.

In brief, when the channel conditions are good, full polyphony can be used, and when there is reduced bandwidth (poor channel conditions), lower polyphony can be used. In a system using the two-way connection 14, the receiver 20B may reply with a feedback message (or by the absence of a periodically sent feedback message) to inform the transmitter 20A that there is a traffic problem in the transmitter-receiver connection 14. In response, the transmitter 20A could reduce the amount of information to be sent, such as by sending only the melody and bass instead of all, for example, 16 voices. In SP-MIDI this would imply that the sender sets a smaller MIP value while lower priority channels are masked (Channel Masking feature), allowing only the higher priority channels to be transmitted.

Error correcting codes may be desired when transmitting MIDI messages over a radio link. The existence of these codes can cause significant overhead. SP-MIDI MIP channel bandwidth dependent polyphony selection may be useful as well in this case. When channel conditions are poor, more efficient correction codes could be used for the MIDI messages, while fewer messages are transmitted. Thus, a tradeoff can exist between the efficiency of the error correction technique and the number of (data) channels employed by SP-MIDI.

In addition, different parsing profiles (categorization of messages as to transmission over reliable or unreliable links) may be used for real-time MIDI communication (such as for group playing sessions) as well as for streamed MIDI communication.

It is also within the scope of this invention to provide the user with some type of visual or auditory feedback if some MIDI messages are lost totally, or if some MIDI information is not transmitted because of channel problems. This type of user feedback also provides the user(s) with the ability to take some positive action to improve the channel conditions.

An example of the applicability of this invention will now be provided in a two user context. Assume that user Ann begins a group playing and drumming application and that user Bill begins to play bass over the drumming. Because each user is playing using headphones it is desired that the MIDI-notes played in each terminal 10 are streamed to the other terminal in order to be heard.

User Bill then desires to use a mobile terminal 10 downloaded algorithmic composition module to play a large desktop synthesizer (shown as MIDI unit 12 in FIG. 1). One reason for this is that the algorithmic application uses very different controllers to control synthesizer parameters, and the synthesizer in the mobile terminal 10 may not respond as well to all of these different controllers. Assume that the terminal 10 does not have a cable-based MIDI output, but both it and the external synthesizer 12 have built-in Bluetooth capability in the network layers 32A, 32B. The use of the teachings of this invention facilitates the streaming of the output generated by the composition algorithm to the larger synthesizer 12. Any controller information missed due to errors in the channel 14B do not cause a failure of the session, as the information is has been partitioned into critical and non-critical messages and transmitted accordingly by the parsing and control unit 26 in the mobile terminal 10 of user Bill.

In this case assume that a large group of users are listening to a MIDI-piece played by user Bill from their own mobile terminals 10, using their own loudspeakers and applications to achieve maximum polyphony. Because these other users can be in motion, the reliability of the Bluetooth connections can be reduced. This results in errors in the MIDI connection, but does not produce hanging notes or other objectionable auditory errors. While some notes may be missed, in practice this is not objectionable due to the large polyphony.

It should be noted that the teachings of this invention may employ error correction techniques for correcting for bit errors in received packets. That is, if a packet is received with a correctable error, then the error is preferably corrected and the packet is not discarded. The error correction could be handled at the network layer 32B, or at the protocol levels 30A, 30B.

While described in the context of certain presently preferred embodiments, the teachings in accordance with this invention are not limited to only these embodiments. For example, other types of data transmission protocols can be employed. Also, the wireless connection between terminals 10 can be other than through a Bluetooth network. In fact, any suitable type of low latency RF connection can be employed, so long as it exhibits the bandwidth required to convey the MIDI messages between the transmitter 20A and the receiver 20B. Further in this regard the link could be made through any suitable connection such as an error-prone packet network, including the Internet.

What is claimed is:

1. A method for transmitting MIDI messages between a transmitter and a receiver through a link that is susceptible to errors, comprising:

parsing MIDI messages to be transmitted into a critical category and a non-critical category; and transmitting critical category MIDI messages using a reliable transmission protocol and non-critical category MIDI messages using a less reliable transmission protocol.

2. A method as in claim 1, where a critical category MIDI message is a Note Off message.

3. A method as in claim 1, where a non-critical category of MIDI message is a Note On message, and where a critical category MIDI message is a corresponding Note Off message.

4. A method as in claim 1, where parsing comprises atomizing to find related MIDI messages.

5. A method as in claim 4, where atomizing comprises encapsulating the related MIDI messages within a common transmission packet.

6. A method as in claim 4, where atomizing comprises placing a Note On message and a corresponding Note Off message within a common transmission packet, and associating a time stamp with at least the Note Off message.

7. A method as in claim 1, where the reliable transmission protocol has a greater latency than the less reliable transmission protocol.

8. A method as in claim 1, where the link comprises a wireless link.

9. A method as in claim 1, where the steps of parsing and transmitting occur within a mobile terminal, and where the link comprises a radio frequency link.

10. A method as in claim 1, where the steps of parsing and transmitting occur within a mobile terminal, and where the link comprises a low power, short range radio frequency link.

11. A method as in claim 1, where the link is comprised of a packet data network.

12. A method as in claim 1, where the link is comprised of a bi-directional radio frequency link that provides an indication from a receiver to the transmitter when MIDI data is received with an error.

13. A method as in claim 12, and further comprising providing a user with knowledge of when MIDI data has been received with an error.

14. A method as in claim 1, where the link is comprised of one of a uni-directional radio frequency link or a bi-directional radio frequency link, and where link error management is adaptive as a function of at least the link quality.

15. A method as in claim 1, where a decision as to an amount of polyphony is made according at least to link conditions.

16. A method as in claim 1, where an amount of polyphony is controlled in accordance with a Scalable Polyphony MIDI Maximum Instantaneous Polyphony MIP value.

17. A method as in claim 1, where a tradeoff exists between the efficiency of a selected error correction technique and the use of Scalable Polyphony MIDI.

18. A method as in claim 1, where in the presence of a link impairment the transmitter reduces a Maximum Instantaneous Polyphony MIP value and where lower priority channels are masked to allow only higher priority channels to be transmitted.

19. A method as in claim 4, where atomizing comprises transmitting only a Note On message, and in the receiver automatically terminating a playing of the note after a predetermined period of time.

20. A method as in claim 4, where atomizing comprises transmitting only a Note On message and an indication of the duration that the note is to be played, and in the receiver automatically terminating a playing of the note after the indicated duration.

21. A method as in claim 1, and further comprising buffering received MIDI messages in the receiver, and controlling scheduling of at least some of the buffered messages in accordance with information transmitted with the MIDI messages.

22. A method as in claim 21, where the information comprises a time stamp.

23. A method as in claim 21, where the information comprises a sequence number.

24. A method as in claim 1, where MIDI messages are transmitted using an error correction code.

25. A system for transmitting MIDI messages between a transmitter and a receiver through a link that is susceptible to errors, comprising a parsing and control function in said transmitter for placing MIDI messages to be transmitted into a critical category and a non-critical category and for transmitting critical category MIDI messages using a reliable transmission protocol and non-critical category MIDI messages using a less reliable transmission protocol.

26. A system as in claim 25, where a critical category MIDI message is a Note Off message.

27. A system as in claim 25, where a non-critical category of MIDI message is a Note On message, and where a critical category MIDI message is a corresponding Note Off message.

28. A system as in claim 25, where said parsing and control function operates to atomize to find related MIDI messages.

29. A system as in claim 28, where atomizing comprises encapsulating the related MIDI messages within a common transmission packet.

30. A system as in claim 28, where atomizing comprises placing a Note On message and a corresponding Note Off message within a common transmission packet, and associating a time stamp with at least the Note Off message.

31. A system as in claim 25, where the reliable transmission protocol has a greater latency than the less reliable transmission protocol.

32. A system as in claim 25, where the link comprises a wireless link.

33. A system as in claim 25, where said parsing and control function resides within a mobile terminal, and where the link comprises a radio frequency link.

34. A system as in claim 25, where said parsing and control function resides within a mobile terminal, and where the link comprises a low power, short range radio frequency link.

35. A system as in claim 25, where the link is comprised of a packet data network.

36. A system as in claim 25, where the link is comprised of a bi-directional radio frequency link that provides an indication from a receiver to a transmitter when MIDI data is received with an error.

37. A system as in claim 36, and further comprising at least one of visual or auditory means for providing a user with knowledge of when MIDI data has been received with an error.

38. A system as in claim 25, where the link is comprised of one of a uni-directional radio frequency link or a bi-directional radio frequency link, and where link error management is adaptive as a function of at least the link quality.

39. A system as in claim 25, where a decision as to an amount of polyphony is made according at least to link conditions.

40. A system as in claim 28, where atomizing comprises transmitting only a Note On message, and in the receiver automatically terminating a playing of the note after a predetermined period of time.

41. A system as in claim 28, where atomizing comprises transmitting only a Note On message and an indication of the duration that the note is to be played, and in the receiver automatically terminating a playing of the note after the indicated duration.

42. A system as in claim 25, and further comprising a receiver buffer for buffering received MIDI messages, and a controller coupled to the buffer for controlling scheduling of at least some of the buffered messages in accordance with information transmitted with the MIDI messages.

43. A system as in claim 42, where the information comprises a time stamp.

44. A system as in claim 42, where the information comprises a sequence number.

45. A system as in claim 25, where an amount of polyphony is controlled in accordance with a Scalable Polyphony MIDI Maximum Instantaneous Polyphony MIP value.

46. A system as in claim 25, where a tradeoff is made between the efficiency of a selected error correction technique and the use of Scalable Polyphony MIDI.

47. A system as in claim 25, where in the presence of a link impairment said transmitter reduces a Maximum Instantaneous Polyphony MIP value and where lower priority channels are masked to allow only higher priority channels to be transmitted.

48. A system as in claim 25, where MIDI messages are transmitted using an error correction code.

* * * * *